US007458734B2

(12) United States Patent
Bookbinder et al.

(10) Patent No.: US 7,458,734 B2
(45) Date of Patent: Dec. 2, 2008

(54) METHOD OF SPLICING AN OPTICAL FIBER WITH HOLES IN THE CLADDING

(75) Inventors: Dana Craig Bookbinder, Corning, NY (US); Ming-Jun Li, Horseheads, NY (US); Mark Alan McDermott, Horseheads, NY (US); Richard Edward Rebis, Corning, NY (US)

(73) Assignee: Corning Incorporated, Corning, NY (US)

( * ) Notice: Subject to any disclaimer, the term of this patent is extended or adjusted under 35 U.S.C. 154(b) by 53 days.

(21) Appl. No.: 11/595,365

(22) Filed: Nov. 9, 2006

(65) Prior Publication Data

US 2008/0110209 A1    May 15, 2008

(51) Int. Cl.
*G02B 6/255* (2006.01)
(52) U.S. Cl. .......................................................... 385/96
(58) Field of Classification Search .................. 385/50, 385/52, 95–98
See application file for complete search history.

(56) References Cited

U.S. PATENT DOCUMENTS

| 6,873,768 | B2 * | 3/2005 | Duelli et al. ................... 385/50 |
| 7,082,242 | B2 | 7/2006 | Fajardo et al. ................. 385/127 |
| 2003/0031432 | A1 * | 2/2003 | Sykora et al. .................. 385/96 |
| 2003/0081915 | A1 * | 5/2003 | Fajardo et al. ................. 385/96 |
| 2004/0052485 | A1 | 3/2004 | Van Eijkelenborg et al. 385/125 |
| 2005/0117860 | A1 | 6/2005 | Vienne et al. ................. 385/115 |
| 2006/0051034 | A1 | 3/2006 | Suzuki et al. .................. 385/96 |
| 2006/0067632 | A1 * | 3/2006 | Broeng et al. .................. 385/96 |
| 2006/0204195 | A1 | 9/2006 | Kurosawa et al. ............ 385/125 |

FOREIGN PATENT DOCUMENTS

| EP | 1655625 | 10/2006 |
| JP | 2002243972 | 8/2002 |
| JP | 2004077890 | 3/2004 |
| WO | WO2006/098470 | 9/2006 |
| WO | WO2006/098471 | 9/2006 |

OTHER PUBLICATIONS

A.D. Yablon, "Optical Fiber Fusion Splicing", Springer, Heidelberg (2005), pp. 43, 49, 53, 68, and 139.
Limin Xiao et al, "Fabrication of Selective injection microstructured optical fibers with a conventional fusion splicer", Optics Express, vol. 13, No. 22, pp. 9014-9022, Oct. 31, 2005.
Takahiro Hamada, et al., "Arc-fusion Splicing Techniques for Holey Fibers", Fujikura Technical Review, 2006, pp. 5-9.

(Continued)

*Primary Examiner*—Sarah Song
(74) *Attorney, Agent, or Firm*—Joseph M. Homa; Matthew J. Mason (57) ABSTRACT

Methods are disclosed herein for joining a first optical fiber and a second optical fiber, wherein at least one of the first and second optical fibers has an annular glass region, such as a cladding, which is provided with a plurality of holes. The methods are well suited for joining a first microstructured optical fiber, such as a first optical fiber having a plurality of holes having a maximum cross-sectional diameter on the order of 7 microns or less, to another second optical fiber. The second optical fiber could be another microstructured optical fiber or a non-microstructured optical fiber.

20 Claims, 3 Drawing Sheets

OTHER PUBLICATIONS

Shigeru Saito, et al., "New Core Alignment Fusion Splicer FSM-50S", Fujikura Technical Review, 2005, pp. 12-16.

Dr. Ning Guan, et al., "Holey Fibers for Low Bending Loss", Fujikura Technical Review, 2005, pp. 1-5.

P.J. Bennett, et al., "Toward practical holey fiber technology: fabrication, splicing, modeling, and characterization", Optics Letters, Sep. 1, 1999, vol. 24, No. 17, pp. 1203-1205.

Kuniharu Himeno, et al., "Low-Bending-Loss Single-Mode Fibers for Fiber-to-the-Home", Journal of Lightwave Technology, vol. 23, No. 11, Nov. 2005, pp. 3494-3499.

Bruno Bourliaguet, et al., "Microstructured fiber Splicing", Optics Express, Dec. 15, 2003, vol. 11, No. 25, pp. 3412-3417.

Joo Hin Chong and M.K. Rao, "Development of a system for laser splicing photonic crystal fiber", Optics Express, Jun. 16, 2003, vol. 11, No. 12, pp. 1365-1370.

\* cited by examiner

METHOD OF SPLICING AN OPTICAL FIBER WITH HOLES IN THE CLADDING

BACKGROUND OF THE INVENTION

1. Field of the Invention

The present invention relates generally to joining optical fibers directly together, and particularly to joining an optical fiber which has a cladding provided with a plurality of holes.

2. Technical Background

Optical fiber containing holes are being designed and produced for a number of applications. Difficulties arise in splicing such optical fiber to conventional optical fiber or to another optical fiber having a cladding provided with a plurality of holes. For example, core alignment of the optical fibers to be joined is hindered by the presence of the holes in the vicinity of the end to be spliced.

SUMMARY OF THE INVENTION

Methods are disclosed herein for joining a first optical fiber and a second optical fiber, wherein at least one of the first and second optical fibers comprises an annular glass region, such as a cladding, which is provided with a plurality of holes. The outermost periphery of the glass region of optical fiber is typically covered by a coating material, and such material is typically stripped away from an end of the fiber that is to be joined or spliced to another optical fiber. The methods are well suited for joining a first microstructured optical fiber, such as a first optical fiber having a plurality of holes having a maximum cross-sectional diameter on the order of 7 microns or less, to another second optical fiber. The second optical fiber could be another microstructured optical fiber or a non-microstructured optical fiber.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description of the present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION OF THE PREFERRED EMBODIMENTS

Reference will now be made in detail to the present preferred embodiment(s) of the invention, examples of which are illustrated in the accompanying drawings. Whenever possible, the same reference numerals will be used throughout the drawings to refer to the same or like parts.

The methods disclosed herein are particularly suited for microstructured fiber having a plurality of holes, also known as voids or openings or apertures or pockets, which may be empty or which may contain one or more gases, wherein the holes are disposed in the cladding that surrounds the core of the optical fiber. The methods disclosed herein are particularly suited for microstructured fiber having a plurality of holes which are non-periodically distributed or even randomly distributed in the cladding. In some embodiments, the maximum diameter of the holes in the fiber is less than 7000 nm, in other embodiments less than 2000 nm, in other embodiments less than 1550 nm, and in other embodiments less than 775 nm, when measured in a cross-sectional plane that cuts perpendicularly to the longitudinal axis of the fiber. In some embodiments, the cladding has fewer than 5000 holes, in other embodiments fewer than 1000 holes, and in other embodiments the total number of holes is fewer than 500 holes, in a given optical fiber perpendicular cross-section. In some embodiments, the mean hole size in the cladding is less than 5000 nm, in other embodiments less than 4000 nm, in other embodiments less than 3000 nm, in other embodiments less than 2000 nm, in other embodiments less than 1550 nm, in other embodiments less than 775 nm, and in still other embodiments less than about 390 nm. The holes may be distributed throughout the cladding, or, in some embodiments, the holes are contained within an annular hole containing region that does not occupy the entire cladding; in some embodiments, the annular hole containing region is radially offset from the core by a hole-free inner annular region disposed between the core and the annular hole containing region. However, the methods disclosed herein need not be used to join one or more microstructured optical fibers only, as the methods can be applied to optical fibers with larger holes as well.

In one aspect, a method is disclosed herein for joining a first optical fiber and a second optical fiber, the first optical fiber comprising a core and a cladding surrounding the core, a first end portion of the first optical fiber comprising a first mating end surface, wherein the cladding of the first end portion comprises a first plurality of holes disposed near the first mating end surface, the second optical fiber comprising a core and a cladding surrounding the core, a second end portion of the second optical fiber comprising a second mating end surface. The method comprises (a) heating a length of the first end portion and a length of the second end portion to a temperature of between 1700 and 2700° K., preferably between 2000 and 2600° K., more preferably between 2300 and 2600° K., for greater than 500 msec, wherein the first end portion does not contact the second end portion, and wherein first and second end portions are not fused together, then (b) moving the first and second mating end surfaces into mutual contact in a coaxial abutting relationship, then (c) fusing together the first and second end portions while the first and second optical fibers contact each other. The first and second end portions are heated during the fusing step, but the end portions contact each other in the fusing step; on the other hand, the end portions do not contact each other during the heating step. The first and second end portions can be fused together by electric arc fusing or by other fusing. Thus, the first end portion of the first optical fiber is heated for a time and temperature sufficient to collapse at least some of the holes in the cladding. In this manner, the core of the first optical fiber can be more efficiently optically sensed when aligning the cores of the first and second optical fibers.

Preferably, the heating step is carried out by heating the length of the first end portion to between 1700 and 2700° K., more preferably between 2000 and 2700° K., even more preferably between 2300 and 2600° K. for greater than 500 msec and less than 1250 msec. Thus, the first end portion of the first optical fiber is heated for a time and temperature sufficient to collapse at least some of the holes in the cladding as well as to limit the rounding of the edge of the first end portion near its mating end surface, thereby preventing the radius of curvature at the interface between the mating end surface and the peripheral surface of the glass portion of the optical fiber from becoming too large, which would otherwise lead to inferior fusing of the mating surfaces of the first and second optical fibers. In some embodiments, after the heating step, the first mating end surface has a radius of curvature less than 25 microns. In other embodiments, after the heating step, the first mating end surface has a radius of curvature less than or equal to about 20 microns.

Holes are collapsed in a sufficient length of the first end portion to permit better optical sensing of the core. In some embodiments, during the heating step, a first collapsed hole region forms in the first end portion extending longitudinally from the first mating end surface, the first collapsed hole region having a longitudinal length greater than or equal to ¼ $W_1$, the outermost diameter of the glass portion of the first end portion of the first fiber. In other embodiments, the longitudinal length of the first collapsed hole region is greater than 75 microns. In other embodiments, the longitudinal length of the first collapsed hole region is greater than 100 microns, and in other embodiments greater than 150 microns During the heating step, the first and second mating end surfaces are spaced apart by a longitudinal distance sufficient to prevent contact or fusing between the first and second end portions, and sufficient to permit more effective heating of the first end portion. In some embodiments, during the heating step, the first and second mating end surfaces are spaced apart by a longitudinal distance of at least 50 microns. In other embodiments, during the heating step, the first and second mating end surfaces are spaced apart by a longitudinal distance of between 50 microns and 300 microns. In still other embodiments, during the heating step, the first and second mating end surfaces are spaced apart by a longitudinal distance of between 150 microns and 250 microns.

The moving step further preferably comprises optically sensing the cores of the first and second optical fibers. For example, the core of the first optical fiber is disposed about a first longitudinal axis, the core of the second optical fiber is disposed about a second longitudinal axis, and the moving step further comprises bringing the cores of the first and second optical fiber into coaxial relationship. By way of other example, the core of the first optical fiber is disposed about a first longitudinal axis, the core of the second optical fiber is disposed about a second longitudinal axis, and the moving step further comprises directing light, preferably collimated light, onto a first external surface of the first end portion in a direction transverse to the first longitudinal axis and onto a second external surface of the second end portion in a direction transverse to the second longitudinal axis.

In some embodiments, the light directed onto the first end portion forms a lighted image of the first end portion of the first optical fiber; wherein the lighted image has a third longitudinal axis, parallel to the first longitudinal axis, and a third width which is orthogonal to the third longitudinal axis and representative of the outermost periphery of the optical fiber. An optical detector is provided having an optical receiving surface having a first length, arranged generally parallel to the third longitudinal axis, and a second length orthogonal to the first length wherein the optical receiving surface receives the lighted image.

Figure 1:
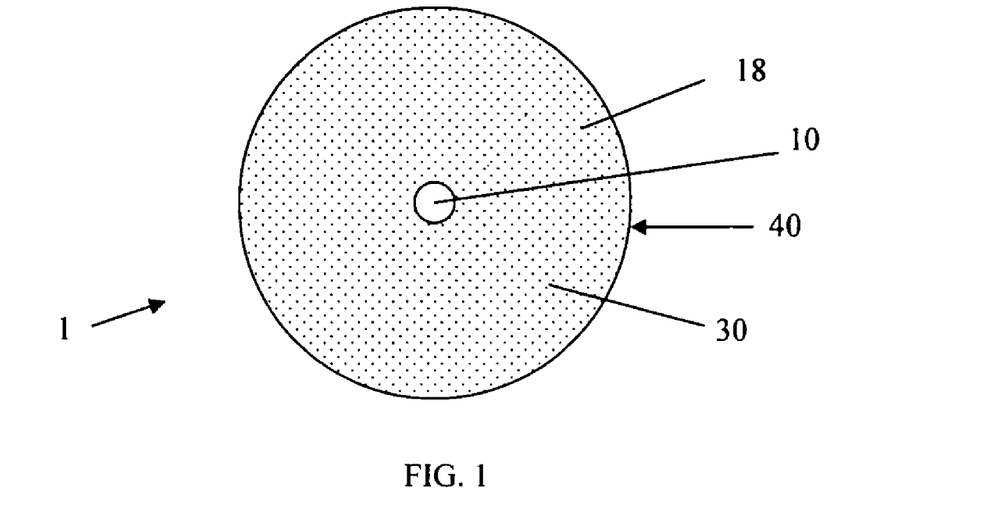
FIG. 1 is a schematic representation of a cross-sectional view of the glass portion of an optical fiber with a cladding provided with a plurality of holes, suitable for the methods disclosed herein.

FIG. 1 shows a schematic representation of a cross-sectional view of the glass portion of an optical fiber 1 comprising a core 10 and a cladding 18 surrounding the core, wherein the cladding 18 is comprised of silica or a silica based material, and the cladding 18 is provided with a plurality of holes 30. In FIG. 1, the holes are distributed generally throughout the cladding 18, extending from an inner region directly adjacent to the core and extending to an outer region at or near the outermost periphery 40 of the cladding. The coating of the optical fiber is not illustrated.

Figure 2:
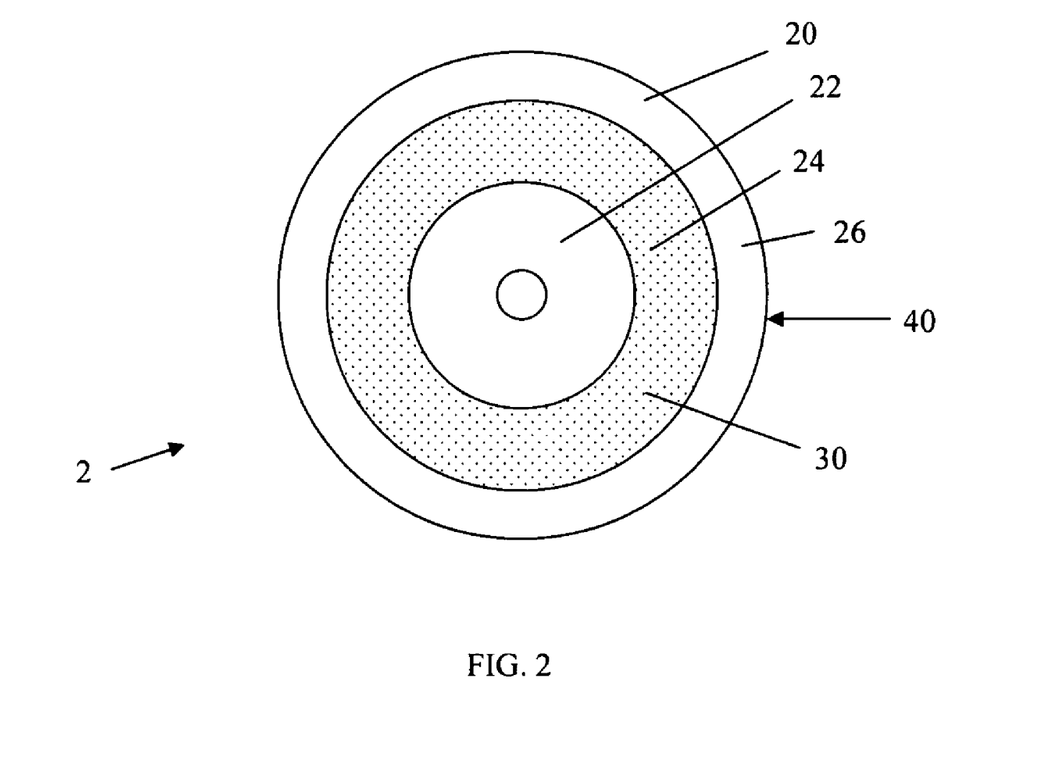
FIG. 2 is a schematic representation of a cross-sectional view of the glass portion of another optical fiber with a cladding provided with a plurality of holes, suitable for the methods disclosed herein.

FIG. 2 shows a schematic representation of a cross-sectional view of another optical fiber 2 comprising a core 10 and a cladding 20 surrounding the core, wherein the cladding 20 is comprised of silica or a silica based material, and the cladding 20 comprises an inner region 22 surrounding and directly adjacent to the core 20, an intermediate region, or "ring", 24 surrounding and directly adjacent to the inner region 22, and an outer region 26 surrounding and directly adjacent to the ring 24, wherein the inner region 22 and the outer region 26 are free of holes, and the ring 24 comprises a plurality of holes. Thus, the cladding 20 is comprised of a plurality of annular regions 22, 24, 26. The coating of the optical fiber is not illustrated.

Optical fiber such as that represented by FIGS. 1 and 2, as well as other optical fiber embodiments having a plurality of holes in the cladding, are contemplated for at least the first optical fiber in the methods disclosed herein. The holes may be periodically arranged in the cladding, such as obtained by stack and draw methods, or the holes may be non-periodically or randomly arranged within the cladding. The holes may be of the same size or may comprise various sizes. For purposes of illustration, representations of the embodiment of FIG. 2 will be shown in subsequent drawings wherein FIG. 2 is intended to represent non-periodically disposed holes.

Figure 3:
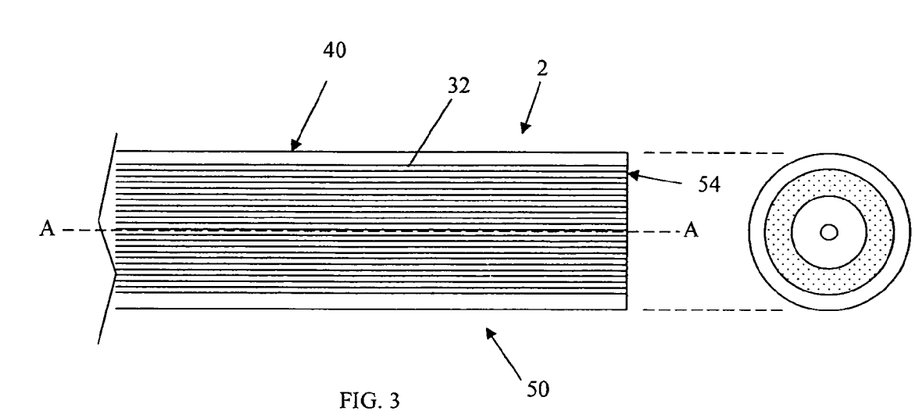
FIG. 3 is a schematic representation of the optical fiber of FIG. 2 illuminated by light aimed toward the end of the fiber 2 transverse to the longitudinal axis A-A of the fiber.

FIG. 3 is a schematic representation of a first end 50 of the optical fiber 2 of FIG. 2 which is illuminated by light aimed toward the end of the fiber 2 transverse to the longitudinal axis A-A of the fiber. In some embodiments, the holes 32 in the cladding 20, represented by the lines 32 in FIG. 3, can entirely obscure the core 10 such that visual or optical detection of the core is not possible with such illumination. However, heating the end of the optical fiber causes holes to collapse, leaving a less opaque silica based material, i.e. glass.

Figure 4:
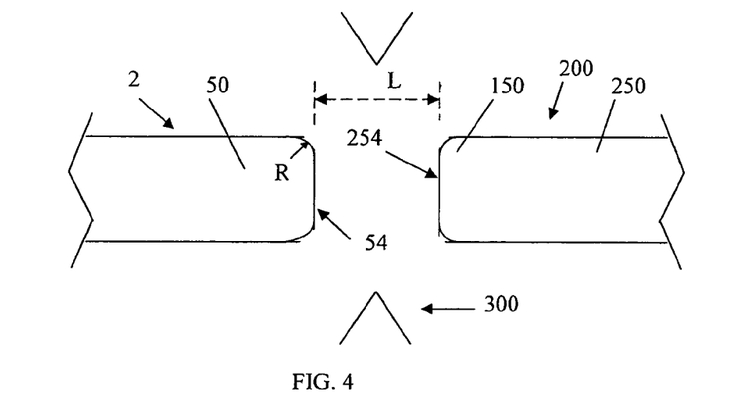
FIG. 4 schematically illustrates the optical fiber of FIGS. 2 and 3 placed in proximity to a second optical fiber, such as within a splicer device, and electrodes.

FIG. 4 schematically illustrates a first end portion 50 of a first optical fiber 2 comprising a cladding 20 provided with a plurality of holes 32, wherein the fiber 2 has been cleaved to provide a first mating end surface 54. The first end portion 50 can be heated by, for example, placing the first mating end surface 54 in proximity to a second mating end surface 254 of a second optical fiber 200, such as within a known optical fiber splicing device, and then generating a plasma field with an voltage potential imposed across electrodes 300 which is capable of heating the first end portion 50. The first end portion 50 of the first fiber 2 and a second end portion 250 of the second optical fiber 200 are arranged with the first and second mating end surfaces 54, 254 in facing relationship, wherein the first and second mating end surfaces 54, 254 are spaced apart from each other by an axial length L, i.e. the first and second mating end surfaces 54, 254 do not contact each other during this heating step. In this arrangement, the first end portion 50 can be heated to collapse at least some of the holes 32 present in the cladding 20, and without the need to remove the first fiber 2 from the splicing device. Preferably, both the first and second mating end surfaces 54, 254 can be cleaned by means of the heating, such as by a voltage potential imposed across electrodes 300. In this arrangement, both the first and second fibers 2, 200 can be cleaned and otherwise prepared for fusion to each other without the need to remove either fiber from its mutual facing relationship in the splicing device.

Figure 5:
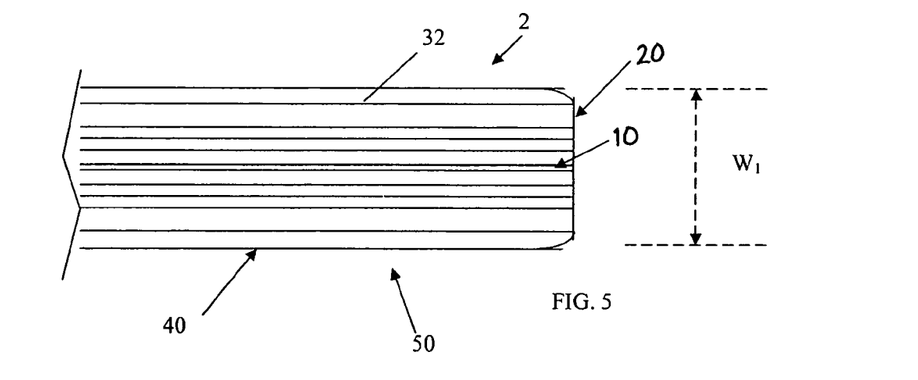
FIG. 5 is a schematic representation of the optical fiber of FIGS. 2-4 after the end portion has been sufficiently heated to collapse enough of the holes to permit visual or optical identification of the periphery of the core.

FIG. 5 is a schematic representation of the first end portion 50 of the optical fiber 2 of FIGS. 3 and 4 after the first end portion 50 has been sufficiently heated to collapse enough of the holes 32 to permit visual or optical identification of the periphery of the core 10. In some embodiments, all of the holes 32 in the cladding 20 of the first end portion 50 are collapsed such that the cladding in that portion 50 is substantially transparent, i.e. no distinct lines from holes 32 are visible when illuminated from the side of the fiber.

Figure 6:
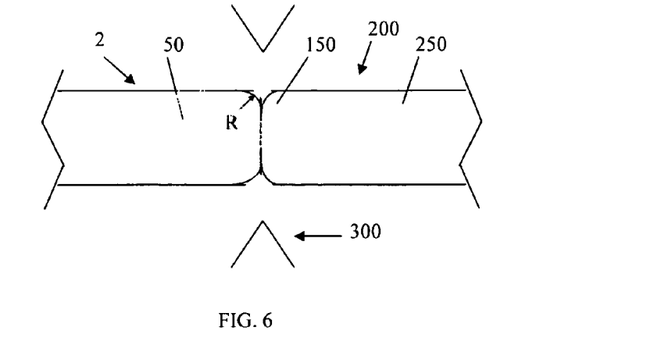
FIG. 6 is a schematic representation of the optical fiber of FIG. 5 in abutting contact with a second optical fiber in the presence of a plasma field.

FIGS. 3 and 5 schematically depict the fiber 2 being illuminated by light directed transverse to the longitudinal axis A-A of the fiber. It should be noted that the lines that appear because of the illuminated holes can appear as lighter areas (e.g. in a transmitted or captured image of the illuminated fiber), but the holes 32 are depicted with dark lines in the Figures for convenience. Thus, the first end portion 50 of the first optical fiber 2 is heated sufficiently to collapse at least some of the first plurality of holes 32 in the cladding 20 near the first mating end surface 54, wherein the first end portion 50 does not contact the second end portion 250 in this heating step, and wherein first and second end portions 50, 250 are not yet fused together. The first end portion 50 of the first optical fiber 2 has been heated sufficiently to permit visual or optical detection of the periphery of the core 20 when light is directed onto an external surface of the first end portion 50 in a direction transverse, preferably at least generally orthogonal, to the first longitudinal axis A-A. Then, after at least some of the first plurality of holes 32 near the first mating end surface 54 collapse, the heating of the first end portion 50 of the first optical fiber 2 is preferably reduced or terminated, and then the fibers 2, 200 are brought into coaxial contact with each other, i.e. at least one of the first and second optical fibers 2, 200 is moved to bring the first and second optical fibers into coaxial, abutting alignment, thereby bringing the first and second mating end surfaces into mutual contact, such that the first and second mating end surfaces 54, 254 do contact each other, as depicted in FIG. 6. Preferably, the first and second fibers 2, 200 are moved into contact with each other while disposed in the same device in which the hole closure was performed. During the moving step, at least one of the first and second fibers 2, 200 is moved in three orthogonal dimensions. In some embodiments, during the moving step, the first and second fibers 2, 200 are each moved in three orthogonal dimensions. Then, the first and second end portions 50, 250 are fused, or welded, together while the first and second optical fibers 2, 200 contact each other, preferably by electric arc. This step is referred to as a "fusing step" to distinguish from the heating to collapse the holes.

Preferably, the moving step further comprises aligning the cores of the first and second optical fibers along a common longitudinal axis. The cores of the first and second optical fibers are optically sensed. The first optical fiber 2 is disposed about a first longitudinal axis, and the first end portion 50 is illuminated from a direction transverse, preferably orthogonal, to the first longitudinal axis. That is, light is directed onto an external surface 40 of the first end portion 50 in a direction transverse, preferably generally orthogonal, more preferably orthogonal, to the first longitudinal axis A-A, thereby permitting visual or optical detection of the periphery of the core 10. Similarly, the core of the second optical fiber is disposed about a second longitudinal axis, and the second end portion is illuminated from a direction transverse (preferably orthogonal) to the second longitudinal axis, i.e. light is directed onto an external surface of the second end portion in a direction transverse, preferably generally orthogonal, more preferably orthogonal, to the second longitudinal axis, thereby permitting visual or optical detection of the periphery of the core.

Referring to FIG. 4, heating should be sufficient over a long enough length of fiber to permit visual or optical detection of the periphery of the core of the fiber having holes, but the heating should not be so great as to cause an undesirable radius of curvature R on the mating end surface(s). Also, the mating end surfaces 54, 254 should not be so close together as to allow fusion of the two fibers during the heating step, i.e. before fibers can be coaxially aligned. However, the mating surfaces 54, 254 of the first and second fibers 2, 200 can be advantageously arranged close enough to each other that arc cleaning of both surfaces can be performed simultaneously.

Preferably, at least some axial length of the first end portion 50 is heated to between 1700 and 2700° K., more preferably between 2000 and 2700° K., even more preferably between 2300 and 2600° K., for greater than 500 msec. More preferably, at least some axial length of the first end portion 50 is heated to between 2300 and 2600° K. for greater than 500 msec. Even more preferably, at least some axial length of the first end portion 50 is heated to between 2300 and 2600° K. for greater than 500 msec and less than 1250 msec.

During the heating step, a first collapsed hole region forms in the first end portion 50 extending longitudinally from the first mating end surface 54, the first collapsed hole region having a longitudinal length preferably greater than or equal to one-fourth the diameter of the glass portion of the first optical fiber, $W_1$, i.e. $\geq \frac{1}{4} W_1$. In some embodiments, the longitudinal length of the first collapsed hole region is greater than 75 microns. In other embodiments, the longitudinal length of the first collapsed hole region is greater than 150 microns.

During the heating step, the first and second mating end surfaces 54, 254 are spaced apart by a longitudinal distance L of at least 20 microns, in some embodiments between 50 microns and 300 microns, and in other embodiments between 150 and 250 microns.

In some embodiments, after the heating step, the first mating end surface 54 has a radius of curvature R less than 25 microns. In other embodiments, the first mating end surface has a radius of curvature less than or equal to about 20 microns after the heating step.

Preferably, the heating occurs after the arranging step. In other embodiments, heating of the first end portion occurs before arranging the two fibers in facing relationship.

In some embodiments, after the heating step, all of the holes at and near the first mating end surface 54 are collapsed.

For a first microstructured optical fiber having a plurality of holes in the cladding, wherein the maximum hole diameter was less than 5000 microns, we have obtained a splice loss (i.e. increase in attenuation of an optical signal due to the presence of the joinder or splice) resulting from the joining of the first and second optical fibers less than 0.020 dB at 1550 nm. We also obtained a splice loss resulting from the joining of the first and second optical fibers less than 0.010 dB at 1550 nm. The holes in the microstructured fiber were non-periodically disposed in the cladding, and the core was germania doped silica. The second optical fiber had a germania doped core and hole-free cladding.

The second optical fiber may be another microstructured optical fiber wherein the cladding of the second optical fiber is comprised of glass provided with its own plurality of holes, i.e. wherein the cladding of the second end portion comprises a second plurality of holes disposed near the second mating end surface. Both the first and second end portions of the first and second optical fibers can then be heated simultaneously, for example by placing both end portions in a splicer device and keeping the mating end surfaces spaced apart.

In some embodiments, the lighted image is directed onto the optical receiving surface such that the third width of the lighted image is less than 0.15 times, preferably less than 0.10 times, the second length of the optical receiving surface.

Figure 7:
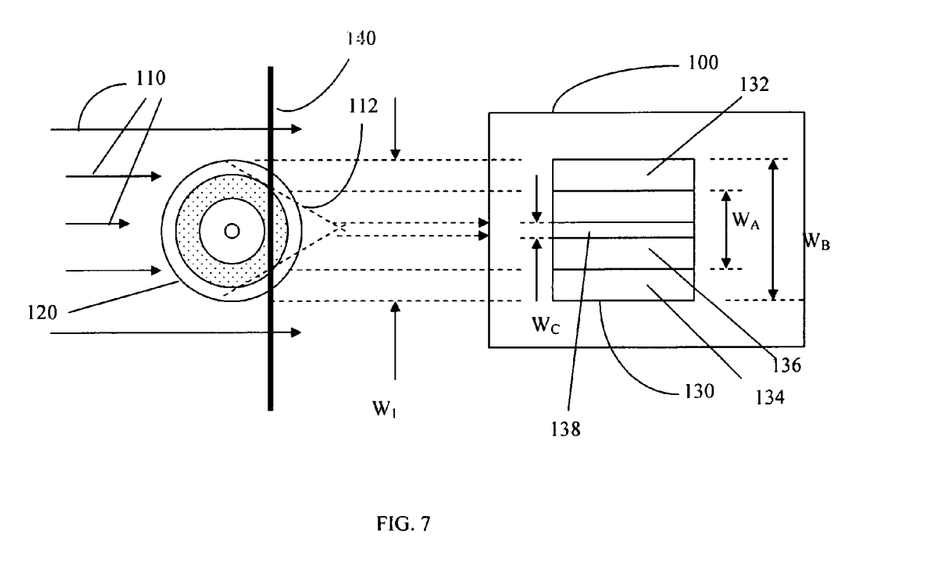
FIG. 7 shows a schematic representation of an arrangement of an optical fiber and an optical detector for receiving the image of the externally illuminated fiber.

FIG. 7 shows a schematic representation of the end view of the first end portion 50 of a first optical fiber 2 and an optical detector 100. Collimated light 110 is directed at the outer periphery 120 of the glass portion of the first optical fiber 2, the coating having been stripped away, the glass portion having a width $W_1$. The light 110 directed onto the first end portion 50 of the first optical fiber 2 forms an image 130 of the first optical fiber 2. The optical detector 100 comprises a focusing system which permits adjustment of the focal plane 140 which focuses the image 130. The image 130 comprises first and second outer portions 132, 134 and a middle portion 136. The middle portion 136 is formed by the light 112 refracted by the first optical fiber 2 and concentrated by the focusing system. The middle portion 136 is disposed between the first and second outer portions 132, 134. The middle portion 136 of the image 130 has a width $W_A$ and the overall image 130 (comprising the first and second outer portions 132, 134 and the middle portion 136) has a width $W_B$. Width $W_B$ is thus proportional to the outer diameter $W_1$ of the glass portion of the first optical fiber 2. The width $W_C$ of the central region 138 of the middle portion 136 corresponds, at least in part, to the core 10 of the first optical fiber 2. We have found that by adjusting the image focal plane 140 such that the ratio of the width of the middle portion divided by the width of the overall image, $W_A/W_B$, is less than 0.15, preferably less than or equal to 0.10, the central region 138 of the middle portion 136 of the image 130 becomes sufficiently focused, i.e. distinguishable enough, to utilize the central region 138 as an optical indication of the presence of the core 10, thereby permitting core alignment of the first optical fiber 2 with another optical fiber. We have found that this approach provides low splice losses even when the first end portion 50 of the first optical fiber 2 comprising a plurality of holes 32 in the cladding 20 has not been heated to collapse any of the holes.

Thus, in another aspect, a method is disclosed herein which is a method for joining a first optical fiber and a second optical fiber, the first optical fiber comprising a core and a cladding surrounding the core, a first end portion of the first optical fiber comprising a first mating end surface, wherein the cladding of the first end portion comprises a first plurality of holes disposed near the first mating end surface, the second optical fiber comprising a core and a cladding surrounding the core, a second end portion of the second optical fiber comprising a second mating end surface, the core of the first optical fiber being disposed about a first longitudinal axis, the core of the second optical fiber being disposed about a second longitudinal axis. The method comprises (a) directing light onto a first external surface of the first end portion in a direction transverse to the first longitudinal axis and directing light onto a second external surface of the second end portion in a direction transverse to the second longitudinal axis, wherein the light directed onto the first end portion forms an image of the first end portion of the first optical fiber; wherein the image has an outer width, $W_B$, corresponding to an outermost width of the glass portion of the first optical fiber, and the image comprises a middle portion having a width $W_A$, the middle portion corresponding to the light directed at the first optical fiber and also refracted by the first optical fiber, wherein the ratio $W_A/W_B$ is less than 0.15; (b) moving the first and second mating end surfaces into mutual contact in a coaxial abutting relationship by utilizing the central region of image of the first optical fiber; and (c) fusing together the first and second end portions while the first and second optical fibers contact each other. The directing step and the moving step can be performed simultaneously. In some embodiments, $W_A/W_B$ is less than or equal to 0.10. In some embodiments, before the directing step, the method also comprises heating a length of the first end portion and a length of the second end portion to between 2300 and 2600° K. for greater than 500 msec, wherein the first end portion does not contact the second end portion during the heating, and wherein first and second end portions are not fused together during the heating.

A first optical fiber comprising a cladding provided with a plurality of holes can thus be joined to a second optical fiber with the methods disclosed herein. In some embodiments, the second optical fiber comprises a core and a cladding, wherein the cladding does not have any holes in its second end portion. For example, SMF-28e® optical fiber from Corning Incorporated has no holes present in the fiber, neither in the cladding nor in the core. In other embodiments, the second optical fiber comprises a core and a cladding, wherein the cladding is provided with holes, such as in its second end portion. Thus, the cladding of the second optical fiber is comprised of glass provided with a plurality of holes, wherein the cladding of the second end portion comprises a second plurality of holes disposed near the second mating end surface. During the heating step, the second end portion of the second optical fiber is heated sufficiently to collapse at least some of the second plurality of holes at and/or near the second mating end surface, and without the second end portion contacting the first end portion. During the heating step, the second end portion is preferably heated simultaneously with the first end portion. At least some of the second plurality of holes at and near the second mating end surface are collapsed by heating before the arranging step. Preferably, during the heating step, a second collapsed hole region forms in the second end portion extending longitudinally from the second mating end surface, the second collapsed hole region having a longitudinal length greater than or equal to ¼ $W_1$.

In another aspect, a method comprises stripping the coating from a section of the first optical fiber before that any part of that section is cleaved. The stripped section is preferably about 10 to 40 mm long. The stripped section is then heated, for example by electric arc, for a time and at a temperature sufficient to collapse at least some of the holes in the cladding of the first optical fiber. Preferably, at least some axial length of the section is heated to between 2300 and 2600° K. More preferably, at least some axial length of the first end portion is heated to between 2300 and 2600° K. for greater than 500 msec. Even more preferably, at least some axial length of the first end portion is heated to between 2300 and 2600° K. for greater than 500 msec and less than 1250 msec. Such heating could be achieved, for example, by placing the uncleaved first optical fiber in a splicer device and exposing the section to an electric arc under the aforementioned conditions. The first optical fiber can then be cleaved, for example in the middle of the collapsed hole region resulting from the heating step, and subsequently resulting in at least one and preferably two optical fiber end portions that are ready for cleaning with solvent and splicing to another fiber.

EXAMPLE

A first optical fiber comprising a core having a step-index type profile with a maximum relative refractive index $\Delta_{1MAX}$ of about 0.35% and a core radius R1 of 4.2 µm, and a cladding surrounding the core, the cladding comprising: an inner annular region surrounding and in contact with the core and extending from R1 to a radius R2 of 13.6 µm, an intermediate ring region extending from R2 to a radius R3 and comprised of silica provided with a plurality of non-periodically disposed holes distributed throughout the ring region, and an outer annular region of silica extending from R3 to the outermost radius of the glass part of the fiber, $R_{OUTER}$. In one cross-section orthogonal to the longitudinal axis of the fiber, the ring region had 79 holes, the maximum hole size being 0.717 µm, and the mean hole size being=0.304 µm. The first optical fiber was cleaved, then its coating was stripped 16 mm from the cleaved first surface, and the cleaved end was then cleaned with isopropyl alcohol solvent. The fiber was then placed in a Fujikura 40F splicer opposite a second fiber, SMF-28e® optical fiber from Corning Incorporated, which had core with a step index refractive index profile with a maximum relative refractive index of about 0.35% and a core radius of about 4.2 µm. The second optical fiber was cleaved, then its coating was stripped 16 mm from a cleaved second surface, and the cleaved end was then cleaned with isopropyl alcohol. The second fiber did not have any holes in its cladding. The outermost radii of each cladding of the first and second fibers were approximately the same. The opposed ends of the first and second fibers were placed about 200 µm apart within the splicer. A light was shone onto the first fiber perpendicular to its longitudinal axis, and the fiber core was not identifiable. The splicer was set to the cleaning arc setting with an electric arc power of 20 bits and an arc was generated for 750 msec. The plasma field of the arc heated the surface of the first and second optical fibers to between 2300 and 2600° K. The first and second fibers were then brought into coaxial abutting alignment by executing the core alignment feature of the splicer. After the respective cores of the fibers were coaxially aligned, an electric arc with 20 bits of power contacted the mating surfaces of the two fibers for 3 seconds and fused the fibers together. The splice loss of the resulting splice was less than 0.02 dB at 1610 nm, less than 0.015 dB at 1550 nm, and less than 0.01 dB at 1480 nm.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. A method for joining a first optical fiber and a second optical fiber, the first optical fiber comprising a core and a cladding surrounding the core, a first end portion of the first optical fiber comprising a first mating end surface, wherein the cladding of the first end portion comprises a first plurality of holes disposed near the first mating end surface, the second optical fiber comprising a core and a cladding surrounding the core, a second end portion of the second optical fiber comprising a second mating end surface, the method comprising:
   heating a length of the first end portion and a length of the second end portion to between 1700 and 2700° K. for greater than 500 msec, wherein the first end portion does not contact the second end portion, and wherein first and second end portions are not fused together;
   moving the first and second mating end surfaces into mutual contact in a coaxial abutting relationship; and
   fusing together the first and second end portions while the first and second optical fibers contact each other.

2. The method of claim 1 wherein the heating step further comprises heating the length of the first end portion to between 2300 and 2600° K. for greater than 500 msec and less than 1250 msec.

3. The method of claim 1 wherein, during the heating step, the first and second mating end surfaces are spaced apart by a longitudinal distance of at least 50 microns.

4. The method of claim 1 wherein, during the heating step, the first and second mating end surfaces are spaced apart by a longitudinal distance of between 50 microns and 300 microns.

5. The method of claim 1 wherein, during the heating step, the first and second mating end surfaces are spaced apart by a longitudinal distance of between 150 microns and 250 microns.

6. The method of claim 1 wherein the moving step further comprises optically sensing the cores of the first and second optical fibers.

7. The method of claim 6 wherein the core of the first optical fiber is disposed about a first longitudinal axis, wherein the core of the second optical fiber is disposed about a second longitudinal axis, and wherein the moving step further comprises bringing the cores of the first and second optical fiber into coaxial relationship.

8. The method of claim 6 wherein the core of the first optical fiber is disposed about a first longitudinal axis, wherein the core of the second optical fiber is disposed about a second longitudinal axis, and wherein the moving step further comprises directing light onto a first external surface of the first end portion in a direction transverse to the first longitudinal axis and onto a second external surface of the second end portion in a direction transverse to the second longitudinal axis.

9. The method of claim 6 wherein the light directed onto the first end portion forms an image of the first end portion of the first optical fiber; wherein the image has an outer width, $W_B$, corresponding to an outermost width of a glass portion of the first optical fiber, and the image comprises a middle portion having a width $W_A$, the middle portion corresponding to the light directed at the first optical fiber and refracted by the first optical fiber, wherein the ratio $W_A/W_B$ is less than 0.15.

10. The method of claim 1 wherein a splice loss resulting from the joining of the first and second optical fibers is less than 0.020 dB at 1550 nm.

11. The method of claim 1 wherein a splice loss resulting from the joining of the first and second optical fibers is less than 0.010 dB at 1550 nm.

12. The method of claim 1 wherein the first optical fiber comprises a glass portion having an outermost diameter, $W_1$, and wherein, during the heating step, a first collapsed hole region forms in the first end portion extending longitudinally from the first mating end surface, the first collapsed hole region having a longitudinal length greater than or equal to about $¼W_1$.

13. The method of claim 12 wherein the longitudinal length of the first collapsed hole region is greater than 75 microns.

14. The method of claim 1 wherein, after the heating step, the first mating end surface has a radius of curvature less than 25 microns.

15. The method of claim 1 wherein the first plurality of holes comprises a maximum hole diameter less than 2000 microns.

16. The method of claim 1 wherein the first plurality of holes comprises an average hole diameter less than 1550 microns.

17. The method of claim 1 wherein the cladding of the second end portion comprises a second plurality of holes disposed near the second mating end surface.

18. A method for joining a first optical fiber and a second optical fiber, the first optical fiber comprising a core and a cladding surrounding the core, a first end portion of the first optical fiber comprising a first mating end surface, wherein the cladding of the first end portion comprises a first plurality of holes disposed near the first mating end surface, the second optical fiber comprising a core and a cladding surrounding the core, a second end portion of the second optical fiber comprising a second mating end surface, the method comprising:

(a) directing light onto a first external surface of the first end portion in a direction transverse to the first longitudinal axis and directing light onto a second external surface of the second end portion in a direction transverse to the second longitudinal axis, wherein the light directed onto the first end portion forms an image of the first end portion of the first optical fiber; wherein the image has an outer width, $W_B$, corresponding to an outermost width of the glass portion of the first optical fiber, and the image comprises a middle portion having a width $W_A$, the middle portion corresponding to the light directed at the first optical fiber and also refracted by the first optical fiber, wherein the ratio $W_A/W_B$ is less than 0.15;

(b) moving the first and second mating end surfaces into mutual contact in a coaxial abutting relationship by utilizing a central region of image of the first optical fiber; and (c) fusing together the first and second end portions while the first and second optical fibers contact each other.

19. The method of claim 18 wherein the directing step and the moving step are performed simultaneously.

20. The method of claim 18 further comprising, before the directing step, heating a length of the first end portion and a length of the second end portion to between 2300 and 2600° K. for greater than 500 msec, wherein the first end portion does not contact the second end portion during the heating, and wherein first and second end portions are not fused together during the heating.

* * * * *